June 8, 1926.
R. A. LIPPS ET AL
1,587,912
LUBRICANT DISPENSING APPARATUS
Filed Feb. 16, 1925
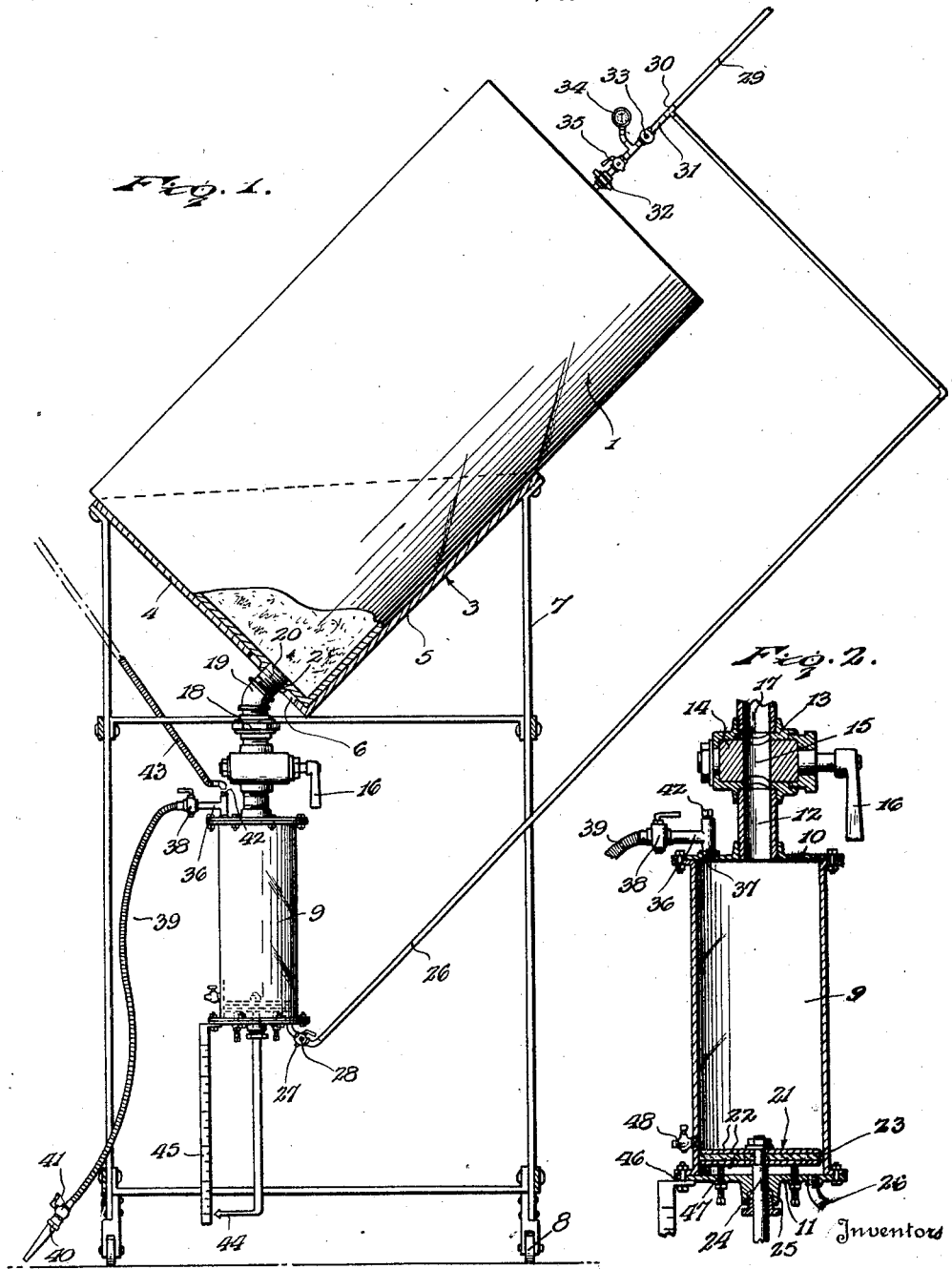
Inventors
R. A. Lipps.
O. D. Hatchett.
By Lacey & Lacey, Attorneys Patented June 8, 1926.

1,587,912

UNITED STATES PATENT OFFICE.

RUFUS A. LIPPS AND OATHER D. HATCHETT, OF DANVILLE, KENTUCKY, ASSIGNORS TO DANVILLE MOTOR COMPANY, OF DANVILLE, KENTUCKY, A CORPORATION OF KENTUCKY.

LUBRICANT-DISPENSING APPARATUS.

Application filed February 16, 1925. Serial No. 9,585.

This invention relates to improvements in lubricant dispensing apparatus and more particularly to an apparatus by the use of which a lubricant, such as grease, may be more readily and conveniently applied to the parts of an automobile which require such lubricant, than is possible by methods at present followed. Ordinarily, grease is supplied to the parts of an automobile by the use of a grease gun or it is supplied, to the transmission, differential, and universal joint housing, from a container from which it is expelled by the exertion of pressure on the mass of grease contained therein, the grease being first drawn into the container by suction from the original container in which the grease was shipped. Not only does the filling of such grease guns or the larger containers require some little time and labor, but there is no certainty as to the precise quantity of grease drawn by suction into the grease gun or container from the source of supply, so that a customer will frequently receive less grease than paid for and an insufficient quantity of grease will be supplied to the parts to be lubricated. Therefore, the present invention contemplates, generally, the provision of a dispensing apparatus which may be readily installed in any garage, repair shop, or filling or supply station, at a low cost, and from which grease may be dispensed directly to the parts to be lubricated and without the inconvenience attending the employment of the old devices referred to.

Another object of the invention is to provide a dispensing apparatus embodying means for indicating accurately the amount of grease delivered therefrom, so that there can be no dispute as to the amount of grease paid for by the user, and, furthermore, it may be readily determined just what quantity of grease is delivered to any one particular part or mechanism of the automobile. In this connection, the invention also contemplates a dispensing apparatus so constructed that the cylinder or temporary container of the dispensing unit will be completely filled with grease prior to dispensing of the grease therefrom, which, as previously stated, is not always accomplished where grease is taken into such a temporary container through the medium of suction.

Another object of the invention is to so construct the apparatus that it may be maintained and operated at a low cost and the supply of grease or other lubricant thereto readily replenished as occasion requires and without the necessity of disconnecting any of the parts of the apparatus or interrupting the operation of the apparatus in any manner whatsoever.

Another object of the invention is to so construct the apparatus that it may be adjusted to deliver predetermined quantities of greases of different density and, at the same time, accurately indicate the precise quantity of grease delivered at any one time.

Another object of the invention is to provide a lubricant dispensing apparatus of such construction that the drums in which lubricant is ordinarily shipped may be employed in the apparatus as a reservoir, with but little labor and expense, thus obviating the necessity of providing a specially constructed reservoir and repeatedly filling the same.

In the accompanying drawings:

Figure 1 is a view in side elevation of the apparatus embodying the invention, parts being shown in section.

Figure 2 is a detail vertical diametric sectional view through the dispensing unit of the apparatus.

The apparatus embodying the invention comprises a reservoir or storage tank which is indicated by the numeral 1 and which may, in fact, be the ordinary drum in which grease is shipped. This drum or tank is provided at one end with the usual threaded opening 2 in which is removably fitted the usual plug (not shown) which closes the drum during shipment and which is removed at the time the drum is installed as a part of the apparatus of the present invention. The opening 2 is, as usual, located at one side of the head of the drum in which it is formed, and means is provided for supporting this drum or tank in the inclined position shown in Figure 1 of the drawings, with its portion in which the opening is formed, lowermost, so that in the operation of the apparatus, substantially all of the grease may be extracted from the drum and there will be practically no waste of grease. The supporting means for the tank or drum comprises a holder 3 which may be of sheet metal, and includes an approximately circular bottom wall 4 and a partly cylindrical bottom wall 5, the holder being, therefore, of a shape and size to more or less snugly receive one end of the drum which constitutes the reservoir, when the drum is disposed endwise within the holder, as shown in Figure 1, the said reservoir being at such time supported in an inclined position, as stated, and the wall 4 of the holder being formed with an opening 6 through which connection may be made with the reservoir by way of the opening 2. The holder 3 is supported in the upper portion of a frame 7 which may be of any desired construction and which is preferably supported by casters 8 so that it may be readily moved about from place to place.

From the reservoir 1, the lubricant is delivered to a dispensing unit which includes a cylinder indicated by the numeral 9, closed at its ends by heads 10 and 11. A short length of pipe 12 is fitted into the head 10, preferably axially thereof and communicates at its other end with one port of the casing of a valve 13, the plug 14 of the valve having a passage 15 therein and being rotatable, through the medium of a manually operable handle 16, into and out of registration with the bore of the pipe 12. A short length of pipe 17 is fitted into the other port of the valve casing and is connected by a union 18, with one end of an elbow or nipple 19 having a threaded portion 20 threaded into the opening 2 in the head of the reservoir 1. In this manner provision is made for the introduction of grease or other lubricant into the cylinder 9 from the reservoir 1, and it will be evident that due to the inclined disposition of the reservoir and the fact that the opening 2 is located substantially at the lowest point thereof, when the reservoir is set up in use, there will be a tendency for the lubricant to flow by gravity from the reservoir into the cylinder 9 of the dispensing unit, and, furthemore, substantially all of the lubricant may be discharged from the reservoir into the said cylinder. The numeral 21 indicates a piston which is slidably fitted in the cylinder 9 and preferably consists of a pair of head discs 22 and an interposed disc 23 of leather or other suitable packing material which is of sufficient diameter to fit snugly at its periphery within the cylinder. The head of the piston is supported axially by a piston rod 24 which is slidably mounted through a stuffing box 25 upon the head 11 of the cylinder, and this piston rod serves as one member of the indicator means heretofore referred to, as will presently be explained.

Fitted into the head 11 of the cylinder 9, is one end of a compressed air supply pipe 26 in which is interposed a combined cut-off and bleed valve indicated by the numeral 27, this valve being adjustable manually and arranged, in one position of adjustment, to permit of delivery of air under pressure from the pipe 26 to the cylinder 9 behind the piston head 21, and, in another position of adjustment, to cut-off the supply of air under pressure to the cylinder and permit of venting of the cylinder by way of a small vent opening 28 provided in one side of the valve casing. As valves of this type are well known and any valve capable of functioning in the manner stated will serve the purpose, it is unnecessary to illustrate the valve in detail. The pipe 26 leads from the cylinder head 11 to a main compressed air supply pipe 29, being connected thereto preferably by a T coupling 30, with which is also connected a pipe 31 leading to and connected by a union 32, with the upper head of the reservoir 1, it being understood that where an ordinary shipping drum is employed as the reservoir, it will only be necessary for the purchaser to drill a hole in that head thereof which ordinarily constitutes the bottom but which, in the adaptation of the drum to the present apparatus, constitutes the upper head thereof, and then provides a suitable connection for the union 32. However, as this may be readily accomplished by anyone in a short space of time and with but little labor, the time and labor involved is more than offset by the economy effected by the direct employment of the shipping drum as the reservoir of the apparatus rather than the provision of a specially constructed reservoir which would require to be filled from such a drum.

A pressure control valve 33 is interposed in the pipe 31 near the union 30 and is constructed and capable of adjustment, as in the case of valves of this type, to provide for the supply of air under pressure from the pipe 29 and pipe 31 to the reservoir up to a predetermined degree of pressure within the tank or reservoir, thereby insuring against bursting of the reservoir through excess pressure. In order that the pressure within the reservoir may be determined at a glance, a pressure gauge 34 is associated with the pipe 31, between the valve 33 and the upper head of the reservoir, and a valve 35 of the same type as the valve 27 is likewise interposed in the pipe 31 between the pressure gauge and the union 32. Through the provision of the combined cut-off and bleed valve 35, the reservoir may be exhausted of air until the air within it is at atmospheric pressure, and before manipulating the union 32 to disconnect the pipe 31 from the reservoir, this being done when the drum comprising the reservoir has been emptied and it is desired to arrange a filled drum in the remainder of the apparatus.

In order that grease may be delivered from the cylinder 9 to the part or parts to be supplied with lubricant, a pipe T 36 has one of its branches fitted, as at 37, into an opening formed in the head 10 of the cylinder, and another branch of the T is connected to one side of the casing of a cut-off valve 38 which is adapted to be opened and closed, manually, to control the delivery of lubricant from the cylinder through a hose 39 which is connected at the other side of the valve casing. A nozzle 40 is connected to the other end of the hose and is equipped with a cut-off valve 41 which may be readily manipulated by the one using the hose, to control the delivery of lubricant to the parts to be supplied. The other branch of the T 36 is normally closed by a plug 42 which, however, may be removed to permit of one end of a hose 43 being fitted to the T, the delivery end of this hose being adapted, in any suitable manner (not shown) for the connection therewith of various types of nozzles or connections such as are, for example, used in connection with a certain well known lubricant supplying apparatus. The hose 43 is furthermore employed where a lubricant lighter than grease is to be dispensed and the manner in which this is accomplished will presently be explained.

In the ordinary operation of the apparatus, assuming that the piston 21 is at the limit of its movement in the direction of the head 10 of the cylinder 9, and further assuming that the valves 35 and 15 are open, the valve 41 closed, and the valve 27 adjusted to position to vent the cylinder at the opposite side of the piston head 21, air under pressure will be admitted from the pipe 29 from any suitable source of compressed air supply such for example as a compressor or an air pressure tank, to the upper portion of the reservoir 1 and the grease or other lubricant will be caused to pass under pressure from the reservoir through the pipes 17 and 12 and past the valve 14 into the cylinder 9, gradually filling the cylinder and causing the piston 21 to move in the direction of the head 11 of the cylinder, until the cylinder has been completely filled. The valve 14 is then closed and the valve 27 is opened, thus admitting air under pressure to the cylinder 9 behind the piston 21 and forcing the piston longitudinally in the cylinder to eject the lubricant from the cylinder through the T 36 and hose 39 and out through the nozzle 40, the valve 41 being opened by the attendant until the desired quantity of lubricant has been delivered from the nozzle, whereupon the valve is closed and the delivery of lubricant will be stopped.

It is intended that the cylinder 9 shall be of such predetermined dimensions that it will deliver a predetermined maximum quantity of lubricant as for example, five pounds, and in order that the amount of lubricant delivered at any time may be readily determined, the piston rod 24 carries at its outer end a laterally directed pointer 44 which coacts with a scale blade 45 detachably secured as by a bolt or otherwise as at 46, to the head 11 of the cylinder 9. Thus, the scale upon the scale blade 45 will be graduated by marks representing pounds and fractions of pounds and the attendant may, therefore, readily determine when a predetermined number of pounds or fractions thereof have been delivered from the cylinder. Different greases have different densities or specific gravities and consequently, different volumes of different greases will have different weights. In order that the travel of the piston 21 in the direction of the head 11 may be limited to a greater or less extent to be determined by the density of the lubricant to be dispensed, abutment screws 47 are threaded, preferably at diametrically opposite points, through the head 11 of the cylinder and may be adjusted so as to project their inner ends a greater or less distance into the cylinder, the inner ends of said screws constituting abutments for the piston head 21 for the purpose stated. If found necessary, for accurate measurement, after adjustment of the abutment screws 47, the scale blade 45 may be readily removed and another blade differently calibrated, substituted therefor.

It will be understood, of course, that when the cylinder 9 is being filled with grease, the valve 27 may be adjusted so as to vent the cylinder at the opposite side of the piston head 21, by way of the vent opening 28 in the casing of the valve. In order that it may be determined whether or not the supply of lubricant is exhausted and likewise in order that the cylinder 9 may be drained, in the lowered position of the piston head 21, and in the event it is desired to introduce into the cylinder some other type of lubricant as for example, an oil, a valve 48 is provided in the wall of the cylinder 9 in a position where it will be slightly spaced from one side of the piston head 21 when the head is at the limit of its movement engaging the abutments 47. When it is desired to dispense a lubricant other than grease, the valve 14 is to be closed, as well as the valve 38, and the more or less fluid lubricant is introduced into the cylinder. Then, after connecting the hose 43 to the T 36, after removal of the plug 42, the valve 27 may be adjusted so as to admit air under pressure into the cylinder behind the piston head 21 and thus effect delivery of the lubricant from the cylinder through the said hose 43.

While, in the illustrated embodiment of the invention, the dispensing unit embodying the cylinder 9 and the parts associated therewith is illustrated as vertically disposed, it will be understood that, if desired, said unit may be horizontally disposed, in which event the reservoir 1 may be supported in a considerably lowered position with respect to the position which it occupies when the dispensing unit is vertical. This, however, as well as other slight changes in the component parts of the apparatus, is within the purview of the invention.

One of the marked advantages presented by the apparatus embodying the invention is that when the grease is transferred directly from the original container to the dispensing cylinder and finally to the part or parts to be supplied with lubricant, this is accomplished without exposure to contamination whereas in the old methods of supplying lubricant to such parts, it very frequently happens that bolts, nuts, pieces of stone or other foreign matter are inadvertently introduced into the lubricant as it is being transferred from the original container by buckets, dippers, or other utensils, to the grease gun or other dispensing apparatus and under these conditions such contaminating particles or objects are most certain to damage the gearing or other moving parts of the automobile upon coming in contact therewith.

Having thus described the invention, what we claim is:

1. Lubricant dispensing apparatus comprising a lubricant reservoir, a dispensing cylinder, a piston working in the cylinder, a pipe establishing communication between the lower portion of the reservoir and the cylinder at one end thereof, a cut-off valve in said pipe, an outlet hose leading from the cylinder at the said end thereof, a connection for a supply pipe likewise at the said end of the cylinder, a valve for controlling the delivery of lubricant from the hose, a compressed air supply pipe communicating with the upper portion of the reservoir, a cut-off valve in the said pipe, a branch leading from the pipe and communicating with the cylinder at the other end thereof, a cut-off valve in the branch pipe, and a drain valve upon the cylinder near the last mentioned end thereof.

2. Lubricant dispensing apparatus comprising a wheeled supporting frame structure, a holder mounted in the top of the frame structure and having substantially the form of an obliquely cut segment of a hollow cylinder, a cylindrical container disposed with one end resting in the holder and with its other end extending upwardly above and beyond the holder, a combined measuring and dispensing cylinder, the container having an opening in its first mentioned end, the bottom of the holder having an opening therein opposite the opening in the end of the container, a lubricant conducting fitting extending from the top of the dispensing cylinder and having its upper end fitted in the opening in the container, the said dispensing cylinder being supported by the said container through the medium of said fitting, the cylinder having an outlet in its upper end, a flexible delivery hose connected with the outlet, a cut off valve in the fitting, a compressed air supply pipe in communication with the upper end of the container, a cut-off valve in the said pipe, a branch leading from the said pipe to the lower end of the cylinder, a cut off valve in the said branch, and a piston working in the cylinder, the said fitting being connected with the said container substantially at the lowermost portion of the container.

In testimony whereof we affix our signatures.

RUFUS A. LIPPS. [L. S.]
OATHER D. HATCHETT. [L. S.]